United States Patent [19]

King et al.

[11] Patent Number: 5,691,723
[45] Date of Patent: Nov. 25, 1997

[54] APPARATUS AND METHOD FOR ENCODING AND DECODING DATA ON TACTICAL AIR NAVIGATION AND DISTANCE MEASURING EQUIPMENT SIGNALS

[75] Inventors: Dennis D. King, Sandy; Jeffery W. Brabender, Taylorsville, both of Utah

[73] Assignee: E-Systems, Inc., Dallas, Tex.

[21] Appl. No.: 526,231

[22] Filed: Sep. 11, 1995

[51] Int. Cl.$^6$ .................................................... G01S 5/02
[52] U.S. Cl. .......................... 341/178; 341/173; 342/47; 342/357
[58] Field of Search .......................... 341/173, 178, 341/182; 342/47, 357; 332/112

[56] References Cited

U.S. PATENT DOCUMENTS

| | | | |
|---|---|---|---|
| 2,421,022 | 1/1947 | Francis | 341/182 |
| 3,491,337 | 1/1970 | Guzak | 341/173 |
| 3,634,855 | 1/1972 | Miller | 341/173 |
| 3,680,117 | 7/1972 | Eckert et al. | |
| 3,870,993 | 3/1975 | Biagi et al. | |
| 3,891,985 | 6/1975 | Oigarden | 341/178 |
| 4,423,419 | 12/1983 | Johannessen | 343/387 |
| 4,751,512 | 6/1988 | Longaker | |
| 4,800,391 | 1/1989 | Enge | 342/389 |
| 4,870,425 | 9/1989 | Gunny | 341/182 |
| 4,894,655 | 1/1990 | Joguet et al. | |
| 5,157,408 | 10/1992 | Wagner et al. | |
| 5,225,842 | 7/1993 | Brown et al. | |
| 5,311,194 | 5/1994 | Brown | |
| 5,323,322 | 6/1994 | Mueller et al. | |
| 5,345,245 | 9/1994 | Ishikawa et al. | |
| 5,361,212 | 11/1994 | Class et al. | |

OTHER PUBLICATIONS

Relative GPS Using DME/TACAN Data Link, James D. Waid and Dennis King, presented to Institute of Navigation (ION) GPS-94 on Sep. 20-23, 1994, Salt Lake City, Utah.

*Primary Examiner*—Jeffery Hofsass
*Assistant Examiner*—Albert K. Wong
*Attorney, Agent, or Firm*—Harold E. Meier

[57] ABSTRACT

A method and apparatus for encoding and decoding data on navigation signal pulse pairs utilizes pulse position modulation (PPM). The pulse interval between a first pulse and a second pulse of the pulse pair is varied depending on whether the logic value of the data to be encoded is a logic "0" or a logic "1". A tri-graph encoding process converts the raw input data into encoded input data. Each input data bit is encoded into three bits with each bit having the same logical value as the input data bit. The encoded input data is then encoded on the navigation signal using a pulse position modulation (PPM) technique. A decoder recovers the encoded data and provides an error correction process for high data integrity that corrects certain bit errors that may occur during the transmission and reception of the data on the navigation signal. The error correction process detects and corrects errors such as a missing bit, an extra bit or a bit error.

20 Claims, 7 Drawing Sheets

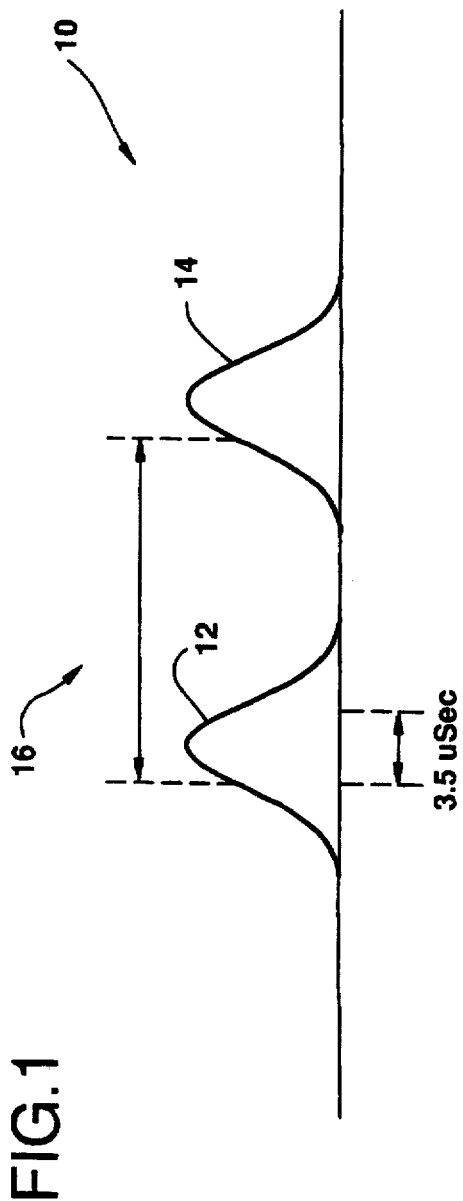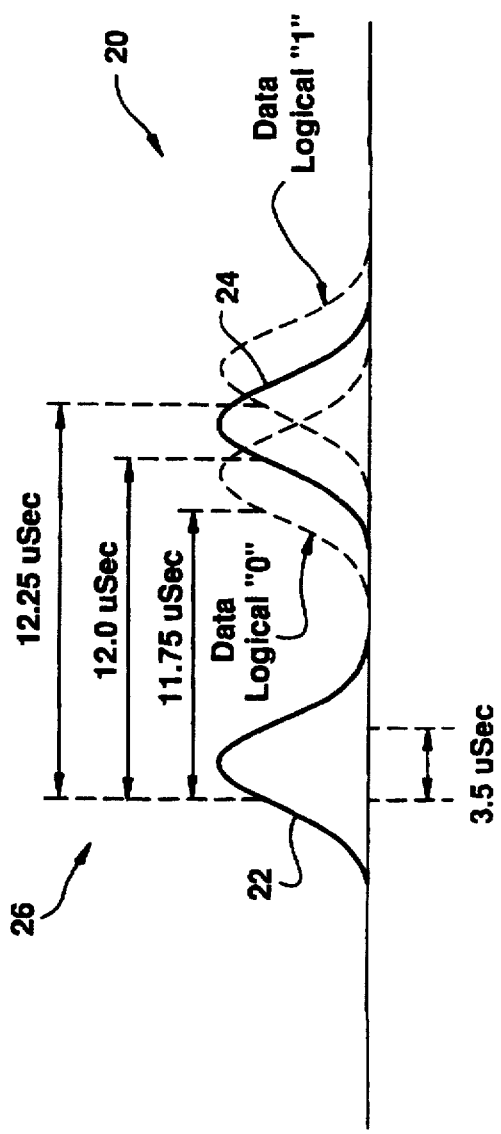

ID id="1" />
APPARATUS AND METHOD FOR ENCODING AND DECODING DATA ON TACTICAL AIR NAVIGATION AND DISTANCE MEASURING EQUIPMENT SIGNALS

TECHNICAL FIELD

The present invention relates to an apparatus and method for encoding and decoding data on tactical air navigation (TACAN) and distance measuring equipment (DME) signals and, more particularly, to an apparatus and method for encoding and decoding data on TACAN/DME signals for use with global positioning systems (GPS).

BACKGROUND OF THE INVENTION

Tactical Air Navigation (TACAN/DME) is used worldwide to provide aircraft with range and azimuth information relative to fixed ground stations. Predominantly used in military applications, TACAN also has utility in commercial applications. Equipment implementing only a ranging function, and not an azimuth determination function, is called distance measuring equipment (DME). As such, DME is a variant or subset of TACAN and refers to the ranging function. DME is commonly used by commercial aircraft.

TACAN/DME up-link and down-link signals consist of pairs of gaussian-shaped 3.5 microsecond wide pulses. These signals are pulses of radio frequency (RF) energy transmitted in pairs on 252 possible channels in the 960–1215 MHz band, consisting of 126 up-link/down-link frequency pair channels. Each frequency pair channel may contain an "X" channel and a "Y" channel, thus increasing channel capacity by using one of two possible pulse-pair spacings on each frequency channel.

The "X" channel pulse pairs are transmitted with a fixed 12.0 μsec spacing between each pulse in the pulse pair. The "Y" channel pulse pairs are transmitted with a fixed 30.0 μsec spacing. This pulse spacing is used to identify the signal as a TACAN/DME signal and to discriminate TACAN systems operating in the "X" or "Y" mode on the same frequency. Any "X" channel signal received exhibiting a pulse spacing outside the range of 12.0±approximately 1.5 μsec is rejected. Any "Y" channel signal received with a pulse spacing outside the range of 30±approximately 1.5 μsec is rejected.

To perform the azimuth determination function, a TACAN ground station continuously transmits thousands of pulse pairs at random intervals each second. These random up-link pulse pairs are called "squirter" signals. The squitter signals are amplitude modulated and are received by a TACAN receiver, commonly referred to as an "interrogator". From the received signals, the TACAN interrogator determines the direction (azimuth) from the station.

The determination of range is accomplished by a process that is different from the azimuth determination function. Each TACAN or DME interrogator transmits sixteen interrogation pulse pairs per second in a random fashion that are received by the TACAN/DME ground station. After a fixed delay, the ground station "replies" with a set of pulse pairs that are received by the interrogator. The aircraft looks for the "replies" to be within a specific "range gate" period of time, and then calculates its distance based on the round-trip travel time of the interrogation/reply sequence.

The 960–1215 MHz TACAN/DME band is used worldwide and is protected for navigation. Conventional TACAN/DME signals are required to meet certain standards and are considered "legal" signals by the International Civil Aviation Organization (ICAO), a United Nations organization that coordinates the use of signals in certain aviation frequency bands.

Different apparatus and numerous methods have been used, or proposed, to provide a data link between a ground station and an aircraft, particularly for the transmission of Differential Global Positioning System (DGPS) signals. The following discusses some of these apparatus and methods.

The most common method is to encode the data on radio frequency (RF) signals using frequency-shift keying (FSK) or binary phase shift keying (BPSK) modulation, or some similar technique, using conventional radios in the VHF and UHF band. While somewhat adequate, the Federal Aviation Administration (FAA) has rejected this approach due to the fact that these bands are not protected internationally for navigational use.

Another possible method is the use of VHF Omnidirectional Ranging (VOR) band signals. Even though protected for navigation, the VOR band is controlled by fixed-based, civil aviation interests and obtaining frequency allocations in this band is extremely difficult.

Another alternate is the use of microwave landing systems (MLS). The MLS band is internationally protected for navigation. The C-band frequency allocation is under demand for other uses and there is currently little commercial use of that portion of the C-band. Consequently, RF components for use in the C-band are scarce and costly making MLS systems relatively expensive. Further, the opportunity for retrofit is almost non-existent since little MLS equipment exists.

The Mode-S portion of the Air Traffic Control Radar Beacon System (ATCRBS) is also being considered for use as a DGPS data link. Mode-S has an up-link instantaneous data capacity of 4 MHz, and it's spectrum and signals are well understood. However, the DGPS requires a very high degree of continuity of service. Mode-S up-link signals are all transmitted on 1030 MHz. This one frequency is used for all ATCRBS mode A/C/S services by all terminal and enroute Secondary Surveillance Radars. Until recently, these radars were the only users of the up-link frequency, and their narrow beams limited their affect on loading. New users are coming on-line that send up-link signals in an omnidirectional fashion. The Transponder Traffic Alert and Collision Avoidance System (TCAS) uses 1030 MHz, and every TCAS-2 equipped aircraft is capable of sending omnidirectional signals. Mode-S, with omnidirectional up-link transmissions, is being considered for use for Airport Surface Traffic Automation as well. The use of mode-S also results in a high number of critical functions being performed in one box on one frequency. There is risk in relying on the highly crowded asynchronous Mode-S system to relay flight critical DGPS or RGPS data. System compatibility is good with air carriers, since all will eventually have mode-S transponders. However, Mode-S will be slow in reaching prices affordable to general aviation aircraft. As 1030 MHz becomes more crowded, site certification of a Mode-S link for a given DGPS installation will become increasingly more difficult and costly to obtain.

A prototype system designed in the 1980's used modified TACAN signals to up-link DGPS data to an aircraft. This prototype system was named "Sea-Based TACAN and GPS" (STAG). However, the problem with the STAG system was that it added a third pulse to the TACAN pulse pair. The addition of the third pulse increased TACAN system loading and violated the international standards for signals transmitted in the TACAN band. Such a system (indeed, any new system with new signals), would require many years of evaluation and testing to prove interoperability with existing systems, followed by the adoption of a new international standard. Another problem with the STAG prototype system was that none of the airborne or ground STAG equipment could operate concurrently as conventional TACANs. Further, the STAG system made no attempt to reduce errors caused by numerous in-band interferers in whose presence TACAN must operate.

Accordingly, there exists a need for an apparatus and method for encoding and decoding data onto existing navigation signals to provide a data link for the transmission of data from one location to another. A modulation method is needed that encodes data on a TACAN/DME signal without affecting the signal's operation for TACAN/DME range and azimuth determination functions. In particular, there is needed a system for encoding data on conventional existing TACAN/DME signals not violative of ICAO standards. Such a system would eliminate the many years of evaluation and testing required to obtain approval to transmit a new signal in a RF band protected for navigation.

Furthermore, there is needed a system that can be incorporated into existing TACAN/DME ground and airborne equipment without affecting its operation for conventional TACAN/DME functions. Additionally, there exists a need for a method of encoding data on a TACAN/DME signal that reduces the effects of signal interferers that interfere with TACAN/DME signals, thus reducing the bit error rate (BER) of the data link. As such, a system is needed for use as a data link with DGPS and RGPS to provide aircraft with accurate positioning information for approach and landing.

SUMMARY OF THE INVENTION

An apparatus and method for encoding data on a navigation signal in accordance with the present invention provides for encoding a single bit of data on a pulse pair having a first pulse and a second pulse separated by a pulse interval by varying the pulse interval between the first pulse and the second pulse to represent the bit of data.

In accordance with the present invention, an apparatus and method for encoding digital data on a navigation signal having a first pulse and a second pulse provides for pulse position modulating the second pulse with respect to the first pulse to generate a first predetermined pulse interval between the first pulse and the second pulse when the digital data is a logic "0" and a second predetermined pulse interval between the first pulse and the second pulse when the digital data is a logic "1".

The preferred embodiment of the present invention provides a datalink system for transmitting and receiving data encoded on the TACAN/DME signal. The datalink system includes an encoder for encoding a single bit of data on a pulse pair having a first pulse and a second pulse separated by a pulse interval by varying said pulse interval between said first pulse and said second pulse to represent the bit of data and produce an encoded pulse pair. The encoder includes a tri-graph encoder that converts an input data bit having a predetermined logic state into an encoded input data bit stream having three data bits, each data bit having a logic state, whereby the logic states of the three data bits are the same. The encoded input data bit stream is then encoded on the TACAN/DME signal. A transmitter is provided for transmitting the encoded pulse pair whereby a receiver receives the transmitted encoded pulse pair. A decoder for decoding the data encoded on the TACAN/DME signal recovers the bit of data encoded and includes an bit error correction process for correcting bits errors including a missing bit, an extra bit and a bit error.

DESCRIPTION OF THE DRAWINGS

For a more complete understanding of the present invention and the advantages thereof, reference is made to the following detailed description taken in conjunction with the accompanying drawings wherein:

FIG. 1 illustrates a conventional TACAN/DME signal showing a pulse pair having a first pulse and a second pulse;

FIG. 2 illustrates the pulse position modulation of the second pulse of the pulse pair in accordance with the present invention;

DETAILED DESCRIPTION

Figure 3:
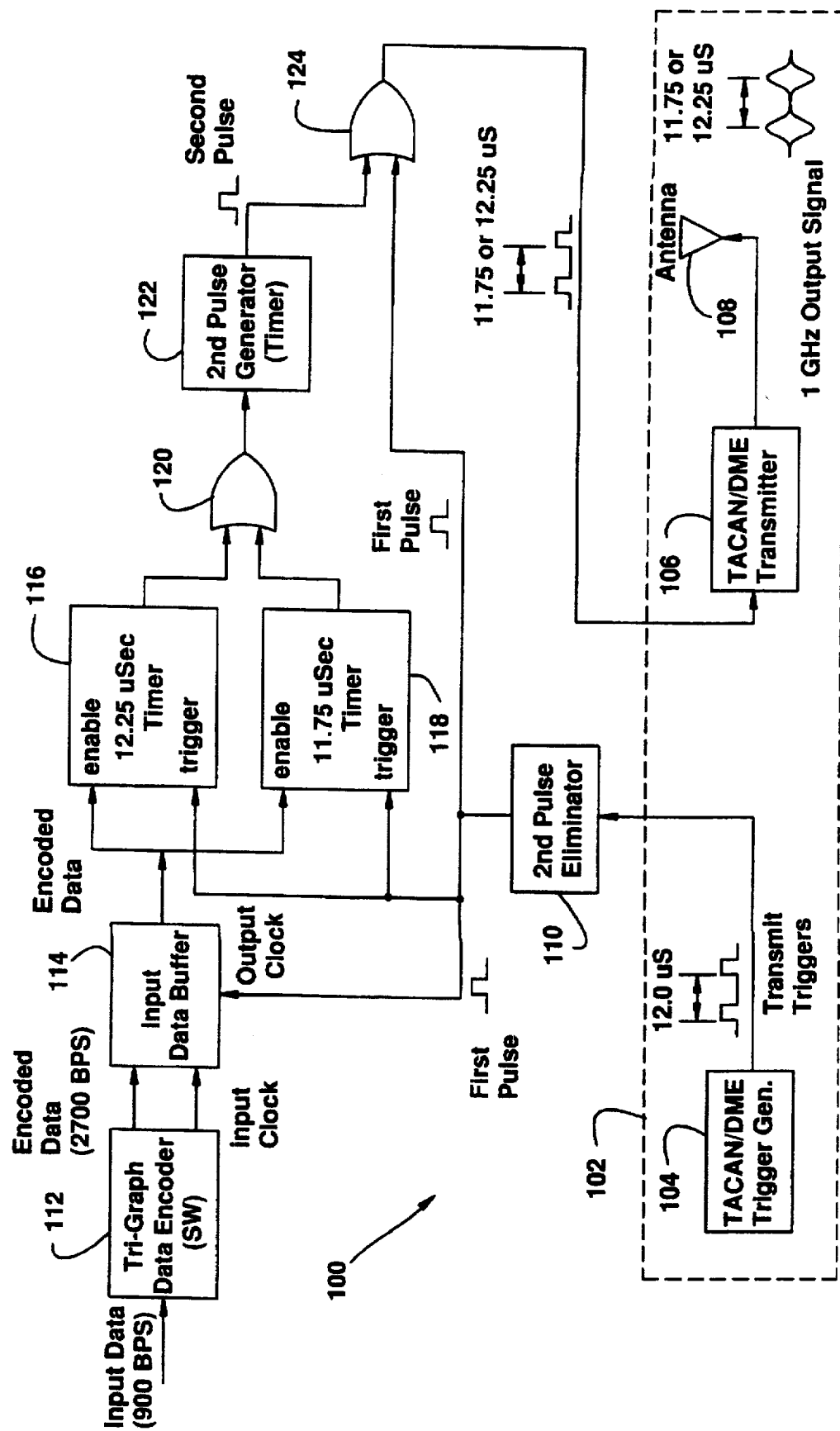
FIG. 3 is a block diagram of an encoder for encoding data on the TACAN/DME signal by pulse position modulating the second pulse.

With reference to the drawings, like reference characters designate like or similar parts throughout the drawings.

With reference to FIG. 1, there is illustrated a conventional TACAN/DME signal 10. The TACAN/DME signal 10 includes a first pulse 12 and a second pulse 14 constituting a pulse pair. Each pulse is approximately 3.5 microseconds wide and is gaussian in shape. Each pulse comprises RF energy having a frequency between 960 and 1215 MHz. The pulse pairs are transmitted with a specific, fixed pulse interval 16 between the first pulse 12 and the second pulse 14. When operating in the X-mode, the pulse interval 16 is 12.0 microseconds, while operation in the Y-mode requires the pulse interval 16 to be 30.0 microseconds. The following description of the operation of the apparatus and method of the present invention will be discussed with respect to the X-mode. As will be appreciated, the present invention is applicable to either the "X" or "Y" mode of operation of the TACAN/DME signal.

Now referring to FIG. 2, there is shown a TACAN/DME signal 20 in accordance with the present invention. The present invention pulse position modulates (PPM) the pulse pairs of a conventional TACAN/DME signal to encode data on the TACAN/DME signal. The TACAN/DME signal 20 includes a first pulse 22 and a second pulse 24 having a pulse interval 26. If the pulse interval 26 is the nominal 12 microseconds (X-mode), no data has been encoded on the pulse pair. If the pulse interval 26 is less than 12 microseconds, a logical "0" has been encoded on the pulse pair, and if the pulse interval 26 is greater than 12 microseconds, a logical "1" has been encoded. The present invention encodes a single bit of data onto each pulse pair by varying the pulse interval 26 about the nominal pulse interval value of 12.0 microseconds.

In the preferred embodiment, the pulse variance about the nominal value is ±0.25 microseconds. Accordingly, a pulse interval 26 of about 11.75 microseconds represents a logical "0" while a pulse interval 26 of about 12.25 microseconds represents a logical "1". As will be appreciated, in the Y-mode the pulse intervals will be about 29.75 and 30.25 microseconds, respectively. The preferred pulse interval variance of about ±0.25 microseconds about the nominal value is within the ±0.5 microsecond pulse interval variance limit needed for all interrogator receivers to accept the TACAN/DME signal with full sensitivity.

The apparatus of the present invention provides the ability to encode one bit of data in each up-link (or down-link) TACAN/DME pulse pair. This effectively provides an inherent data capacity of 2700 bits per second (BPS) for conventional DME transponder squitter rates and 3600 BPS for conventional TACAN transponder squitter rates. Further, an increase in the pulse pair rate per second, for example, up to 40,000 pulse pairs per second, would result in a higher data rate and data capacity. While the present invention described is for a TACAN/DME up-link, it is applicable to TACAN air-to-air and air-to-ground communications as well.

Now referring to FIG. 3, there is shown a block diagram of an encoder 100 in accordance with the present invention. Also shown in FIG. 3 is a block diagram of a portion of a conventional TACAN/DME transmitting system 102.

The conventional TACAN/DME transmitting system includes a TACAN/DME trigger generator 104, a transmitter 106 and an antenna 108. The trigger generator 104 generates approximately 2700 pulse pairs per second, with each pulse of the pulse pair separated by 12.0 microseconds in the X-mode and 30.0 microseconds in the Y-mode. Only the X-mode operation is illustrated in FIG. 3 and described herein. The Y-mode operates similar, except that the nominal pulse interval is 30.0 microseconds instead of 12.0 microseconds. During conventional operation, the pulses from the trigger generator 104 are applied to the transmitter 106 for transmitting a RF pulse (having a frequency in the range of 960-1215 MHz) to the antenna 108 corresponding to each pulse from the trigger generator 104. In accordance with the present invention, the pulses generated by the trigger generator 104 are modified by the encoder 100 prior to application to the transmitter 106.

The pulse pairs generated by the TACAN/DME trigger generator 104 are applied to a pulse eliminator 110 of the encoder 100. The pulse eliminator 110 "strips" off, or eliminates, the second pulse of each pulse pair. The output of the pulse eliminator 110 is the first pulse only of each pulse pair.

Input data to be transmitted on the TACAN/DME signal is input to a tri-graph data encoder 112. The tri-graph data encoder 112 provides error correction coding of the input data by replacing each input data bit with three data bits representing each encoded input data bit. Each logical "1" or logical "0" input data bit is replaced with a logical "1 1 1" bit string or logical "0 0 0" bit string, respectively. As a result, at an input data rate of 900 BPS, 2700 BPS of encoded input data is output from the tri-graph data encoder 112. If the input data rate is below 900 BPS, the tri-graph data encoder generates alternate logical "0's" and "1's", where appropriate, to indicate no data is being transmitted. These alternate "1's" and "0's" are ignored in the subsequent decoding process.

The above described encoding process reduces the possibility of bit errors caused by interference inherent in the TACAN/DME operating environment. Many high power interferers are present in the TACAN/DME operating environment. Interference is generated from other interrogating TACAN/DME (on-board the aircraft or from other aircraft) and other in-band systems such as the Air Traffic Control Radar Beacon System (ATCRBS) mode C/A and mode S signals, the ATC Secondary Surveillance Radar (ATCSSR) system, and the Transponder Traffic Alert and Collision Avoidance System (TCAS). These interferers constantly interrupt the flow of data into a TACAN/DME receiver. Accordingly, the tri-graph data encoding process of the present invention helps reduce the possibility of data bit errors. As will be appreciated, different encoding techniques or methods may be utilized to reduce the possibility of data bit errors caused by interference with the TACAN/DME signals.

The encoded input data output from the tri-graph data encoder 112 is input to an encoded input data buffer 114. The encoded input data buffer 114 serially clocks out the encoded input data when a "clock pulse" is received from the pulse eliminator 110. This "clock pulse" is the first pulse of each pulse pair. The data bit output from the encoded input data buffer 114 either enables a first timer 116 or a second timer 118, depending on the logical state of the output data bit. When the data from the encoded input data buffer 114 is a logical "1", the first timer 116 is enabled and the second timer 118 is disabled, and vice versa for a logical "0". Both the first timer 116 and the second timer 118 are triggered by the output of the pulse eliminator 110 (i.e. the first pulse of a pulse pair). The output of the first timer 116 and the output of the second timer 118 are both input to an OR gate 120. The output of the OR gate 120 is a 12.25 microsecond wide pulse when the corresponding data bit output from the encoded input data buffer 114 is a logical "1". Similarly, the output is a 11.75 microsecond wide pulse when the corresponding data bit output is a logical "0".

The output of the OR gate 120 is applied to a pulse generator 122 to generate a position-shifted "second pulse". The pulse generator 122 operates on the falling edge of the pulse output from the OR gate 120 to produce this new "second pulse". The pulse output from the pulse generator 122 is delayed with respect to the first pulse output from the pulse eliminator 110 by either 12.25 or 11.75 microseconds, depending on the value of the input data. The "first pulse" from the pulse eliminator 110 and the new, position-shifted "second pulse" output from the pulse generator 122 are combined by an OR gate 124 to produce a pulse position modulated (PPM) pulse pair. The PPM pulse pair is then input to the transmitter 106 for transmission as a data encoded TACAN/DME signal in accordance with the present invention.

In the preferred embodiment, the pulse interval between the first pulse and the second pulse is about 11.75 and 12.25 microseconds, representing a logical "0" and a logical "1", respectively. It will be understood that different pulse intervals or spacing can be used to represent the data encoded on the TACAN/DME signal.

Figure 4:
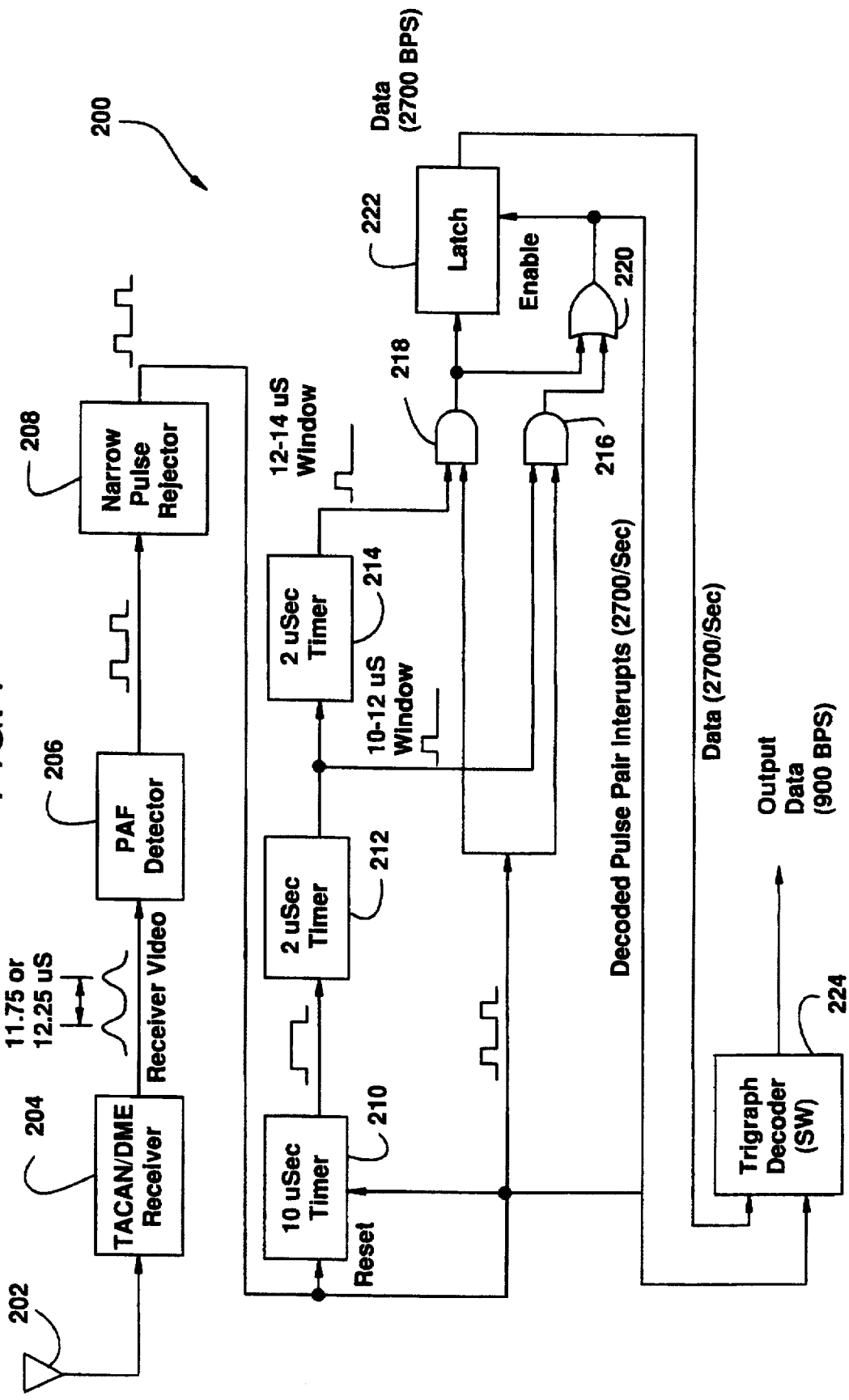
FIG. 4 is a block diagram of a decoder for decoding the data encoded on the TACAN/DME signal.

Now referring to FIG. 4, there is illustrated a block diagram of a decoder 200 for decoding the data encoded on the TACAN/DME signal transmitted by the transmitter 106. A receiver 204 and an antenna 202 receive incoming RF signals from the transmitter 106. The receiver 204 and the antenna 202 represent a portion of an existing TACAN/DME interrogating receiver.

A peak-amplitude-find (PAF) detector 206 receives the RF pulse pair signal from the receiver 204 and generates a corresponding logical pulse pair. The corresponding logical pulse pair has leading and trailing edges corresponding at the points in time where the amplitude of the RF signal crosses a threshold level that is 6 dB below the peak value. Accordingly, the PAF detector 206 converts the RF pulse pair (gaussian-shaped) to a logical pulse pair. The logical pulse pair is then applied to a narrow pulse rejector 208. The narrow pulse rejector 208 substantially eliminates logical pulses having a pulse width less than 2.5 microseconds.

Performance of the decoder 200 is improved by ignoring short pulses generated by any interfering systems and by receiver noise.

After passing through the narrow pulse rejector 208, the first pulse of each detected pulse pair triggers a series of timers that include a first timer 210, a second timer 212 and a third timer 214. The first timer 210 is a ten-microsecond timer that is coupled to the second timer 212. The second timer 212 is a two-microsecond timer. The output of the second timer 212 is a logical pulse "window" that occurs from 10.0 to 12.0 microseconds after the arrival of the first pulse of a pulse pair. The output of the third timer 214 (also a two-microsecond timer) is a logical pulse "window" occurring from 12.0 to 14.0 microseconds after the arrival of the first pulse of a pulse pair.

Both the output of the second timer 212 and the output of the narrow pulse rejector 208 are input to an AND gate 216. The AND gate 216 outputs a logic pulse if the pulse interval between the first pulse and the second pulse of a pulse pair is between 10.0 and 12.0 microseconds. This corresponds to a received data value of "logic 0" encoded on the pulse pair. Similarly, the output of the third timer 214 and the output of the narrow pulse rejector 208 are input to an AND gate 218. The AND gate 218 outputs a logic pulse if the pulse interval between the first pulse and the second pulse of a pulse pair is between 12.0 and 14.0 microseconds. This corresponds to a received data value of logic "1" encoded on the pulse pair.

The outputs of the AND gate 216 and the AND gate 218 are input to an OR gate 220. If the output of either the AND gates 216 or 218 is a logic pulse, then the output of the OR gate 220 is a logic pulse. The output of the OR gate 220 indicates when a valid pulse pair has been received by the decoder 200. The output of the OR gate 220 also enables a latch 222 to latch in the output value of the AND gate 218 when a valid pulse pair is received. If the pulse interval is 12.25 microseconds (representing a logic "1"), the value latched into the latch 222 is a logic "1". If the pulse interval is 11.75 microseconds (representing a logic "0"), the value latched into the latch 222 is a logic "0".

Additionally, the output signal of the OR gate 220 is input to a tri-graph decoder 224. When a logic pulse is applied to the tri-graph decoder 224 from the OR gate 220, the tri-graph decoder 224 accepts the value from the latch 222. This allows the data encoded on the pulse pair to be input to the tri-graph decoder 224. The tri-graph decoder 224 performs error correction and removes the data encoding performed by the tri-graph data encoder 112 (shown in FIG. 3). The output of the tri-graph decoder 224 represents the data bits encoded on each pulse pair (by pulse position modulation) transmitted by the TACAN/DME transmitter. In the tri-graph decoder, alternate "1's" and "0's" received from the latch 222 are ignored since this indicates no data has been transmitted.

As described earlier, the tri-graph decoder 224 performs error correction on the data recovered from the TACAN/DME signal. With reference to FIGS. 5A, 5B, 5C and 5D, there is illustrated a flow diagram of a tri-graph error correction algorithm 300 according to the present invention. The algorithm 300 corrects errors that include a missing bit, an extra undesired bit or a bit error. As set forth earlier, each source data bit is encrypted into three data bits prior to encoding on the TACAN/DME pulse pair. If the source data bit is a logic "0", the three encrypted data bits are all "0's", and if the source data bit is a logic "1", the three encrypted data bits are all "1's". With a source data stream of 900 BPS, the encrypted data stream will be 2700 BPS.

Now referring to FIGS. 5A, 5B, 5C and 5D, the tri-graph error correction algorithm 300 provides a process for correcting certain data bit errors. These data bit errors include either a missing bit, an extra bit or a bit error. As will be understood, an encrypted (tri-graph encoded) data bit stream, 2700 BPS in the preferred embodiment, is applied to the tri-graph decoder 224 as shown in FIG. 4. The tri-graph decoder 224 performs the tri-graph error correction algorithm 300 to decode the encrypted data bits and to correct any of the above-described data bit errors.

The algorithm 300 utilizes several variables during the decode/error correction process. These include variables "LOST BIT", "EXTRA BIT", "LAST LOST BIT" and "LAST EXTRA BIT". The "LOST BIT" and "EXTRABIT" variables comprise integer values, while the "LAST LOST BIT" and "LAST EXTRA BIT" variables each contain a string of three logic bits (i.e. each logic bit equals a "0" or "1"). Upon initialization, all four variables are set to zero or all zeros.

Figure 5A:
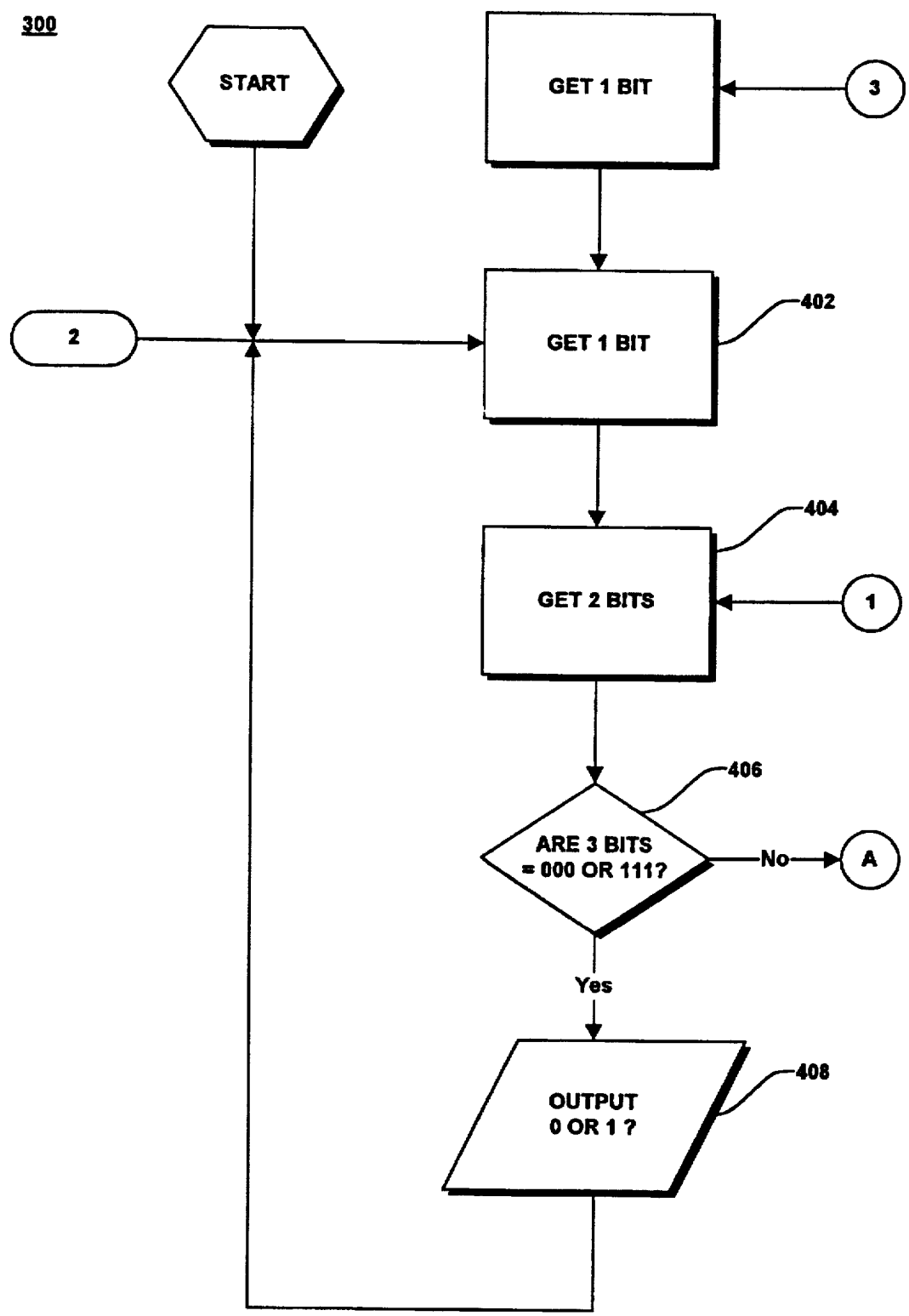
FIGS. 5A, 5B, 5C and 5D illustrate a flow diagram of a tri-graph error correction algorithm performed by the decoder in accordance with the present invention.

With reference to FIG. 5A, the algorithm 300 begins at the position marked as "START". Initially, three bits of the encrypted data bits are obtained in a step 402 and a step 404 and will be referred to as the "THREE BITS". In a step 406, the process determines whether the "THREE BITS" equal either "000" or "111". If so, the tri-graph decoder outputs a data bit "0" if the "THREE BITS" equal "000" or a data bit "1" if the "THREE BITS" equal "111", in a step 408. After performing step 408, algorithm 300 returns to the "START" position and begins again by obtaining three more bits. If the "THREE BITS" do not equal "000" or "111" in the step 406, the algorithm continues to a point A (as shown in FIG. 5B).

Figure 5B:
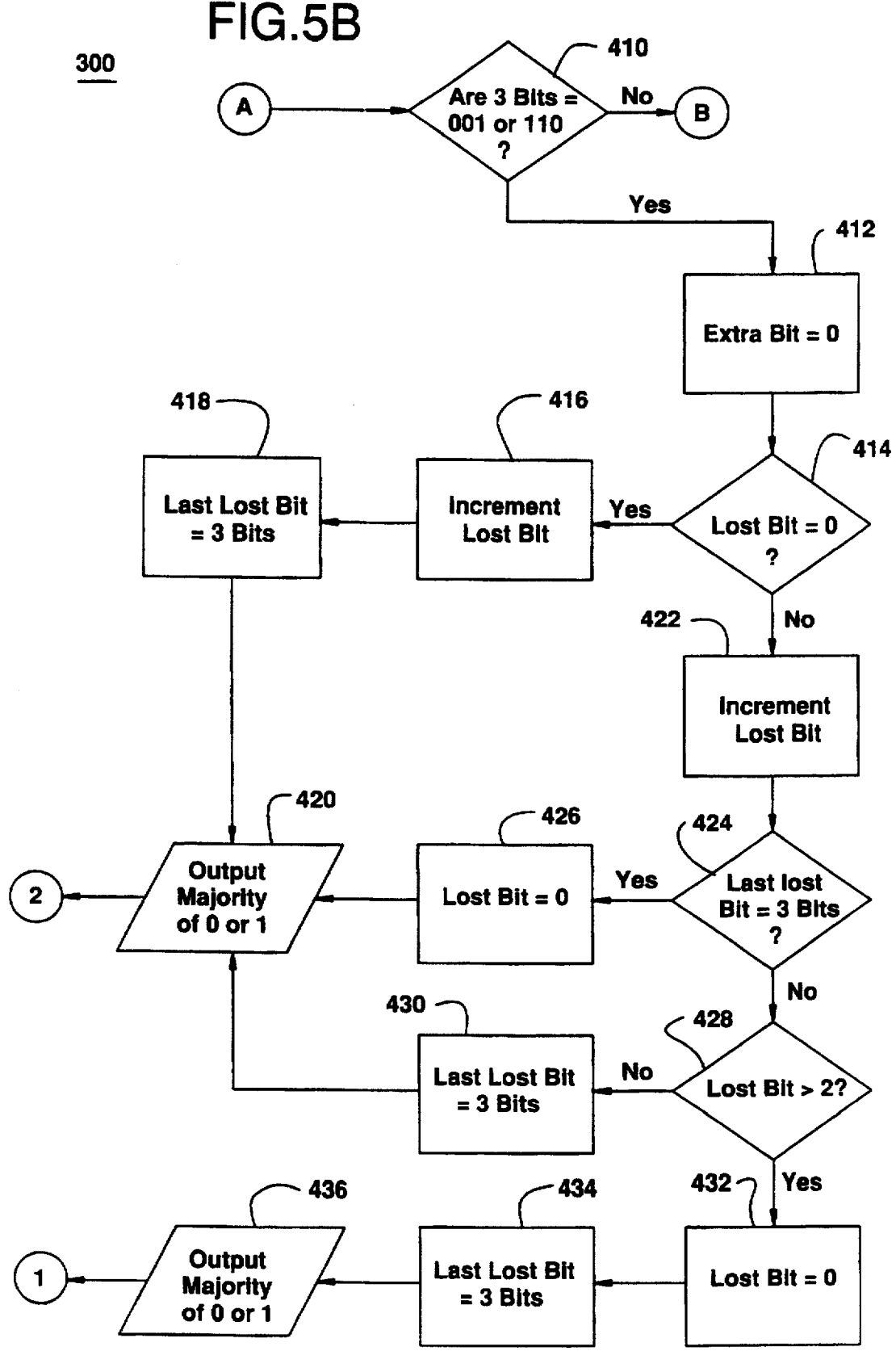

With reference to FIG. 5B, there is shown the process flow for determining whether the data bit error is due to a lost bit (and correcting same). In a step 410, the algorithm determines whether the "THREE BITS" equal either "001" or "110". If so, at a step 412, the variable "EXTRA BIT" is set equal to zero. In a next step 414, the algorithm determines whether the variable "LOST BIT" is equal to zero. If so, the variable "LOST BIT" is incremented by one and the variable "LAST LOST BIT" is set equal to the "THREE BITS" in a step 416 and a step 418, respectively. Next, in a step 420, the tri-graph decoder 212 outputs a data bit corresponding in value to the majority of "0's" or "1's" of the "THREE BITS" (e.g. outputs a data bit "0" if the "THREE BITS" equal "001" or a data bit "1" if the "THREE BITS" equal "110"). Thereafter, the process continues to the "START" position and begins processing three more bits.

If the variable "LOST BIT" does not equal zero in the step 414, the variable "LOST BIT" is incremented by one in a step 422. In a next step 424, the algorithm determines whether the variable "LAST LOST BIT" equals the "THREE BITS". If so, the variable "LOST BIT" is set equal to zero in a step 426 and the algorithm continues to the step 420. If, in the step 424, the variable "LAST LOST BIT" does not equal the "THREE BITS", a determination is made whether the variable "LOST BIT" is greater than two, in a step 428. If the "LOST BIT" is two or less, the variable "LAST LOST BIT" is set equal to the "THREE BITS" in a step 430 and the algorithm continues to the step 420. Otherwise, the variable "LOST BIT" is set equal to zero and the variable "LAST LOST BIT" is set equal to the "THREE BITS" in a step 432 and a step 434, respectively. Next, the tri-graph decoder outputs a data bit corresponding in value to the majority of "0's" or "1's" of the "THREE BITS" in a step 436 and the algorithm continues to the step 402 (shown in FIG. 5A). As such, only two bits are obtained and the process starts over with the two new bits and one previous bit from the prior "THREE BITS".

Figure 5C:
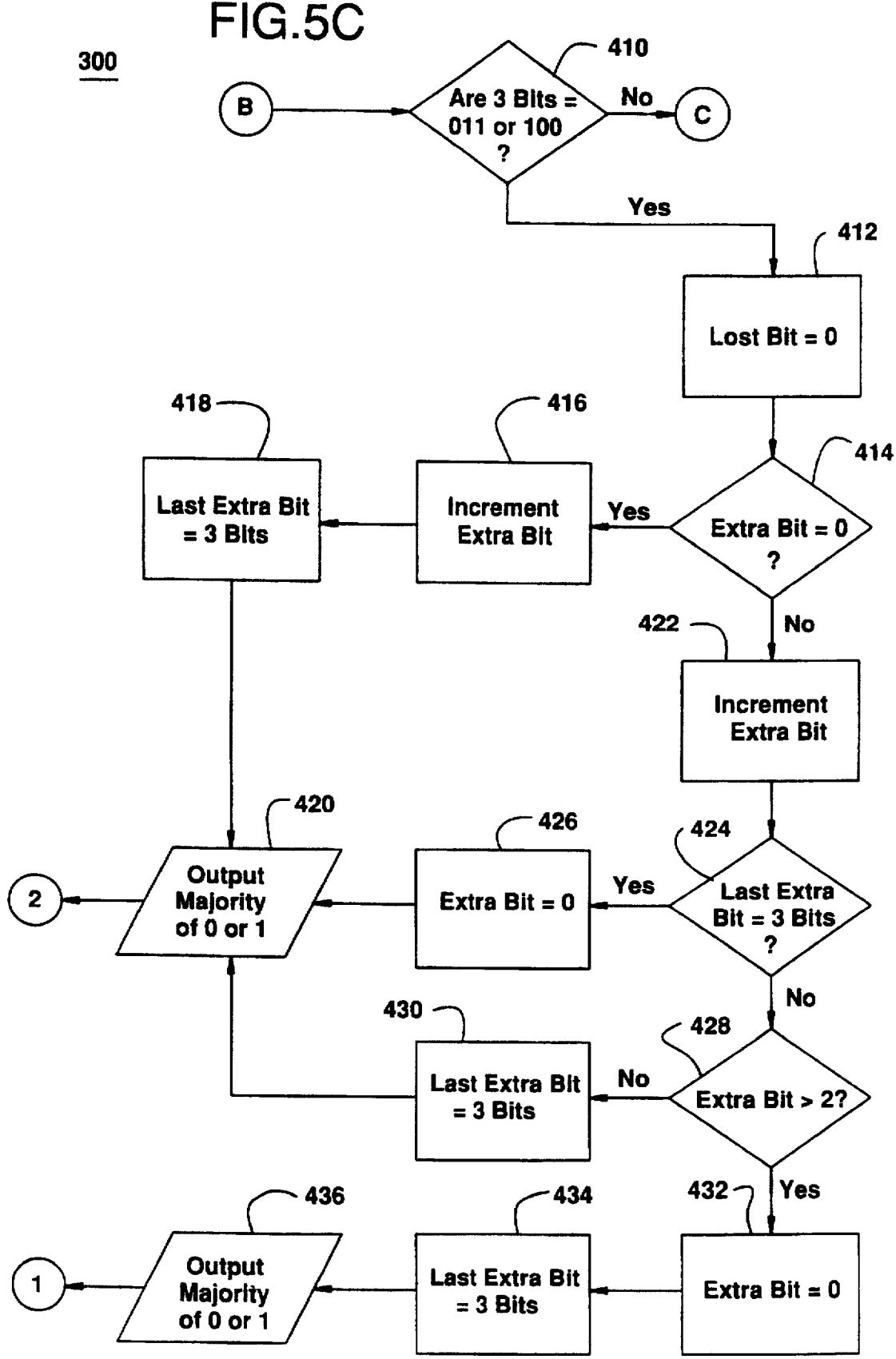

In the step 410, if the "THREE BITS" do not equal "001" or "110", the algorithm continues on to point B (shown in FIG. 5C). Now referring to FIG. 5C, there is shown the algorithm flow for determining whether the data bit error is due to a missing bit (and correcting same). The algorithm is similar in flow to the process for detecting and correcting an extra bit error as set forth in FIG. 5B. As such, a detailed written description for the algorithm shown in FIG. 5C is omitted for convenience.

Figure 5D:
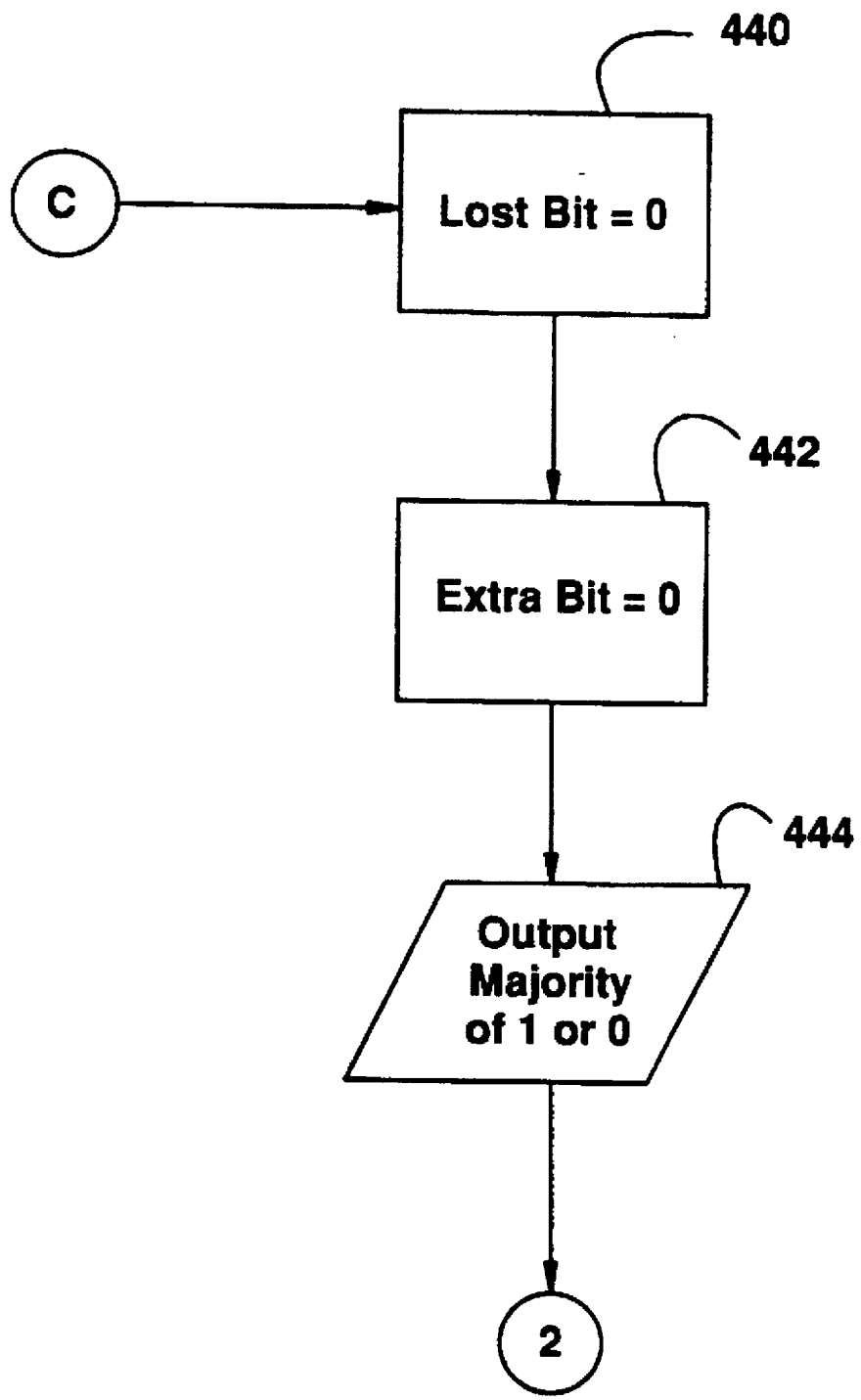

Now referring to FIG. 5D, there is shown the process flow for correcting a data bit error not caused by an extra bit or a missing bit. This portion of the algorithm is performed only when the "THREE BITS" equal "010" or "101". In a step 440 and a step 442, respectively, the variable "LOST BIT" and the variable "EXTRA BIT" are set to zero. In a next step 444, the tri-graph decoder 212 outputs a data bit corresponding in value to the majority of "0's" or "1's" of the "THREE BITS" (e.g. outputs a data bit "0" if the "THREE BITS" equal "010" or a data bit "1" if the "THREE BITS" equal "101"). Thereafter, the algorithm returns to the "START" position and begins again by obtaining three more bits.

As described in the foregoing, the apparatus for encoding and decoding data on TACAN/DME signals provides a data link for transmission of data. In the preferred embodiment, the data link provides a means for transmitting differential GPS (DGPS) or relative GPS (RGPS) data information to aircraft from a ground station. As will be appreciated, the present invention can be used as a datalink for transmitting all types of data, not only DGPS or RGPS data, and may include data for air-to-ground, ground-to-air or air-to-air communications.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention.

What is claimed is:

1. A method of encoding data on a pulse pair of a navigation signal having a first pulse and a second pulse, comprising the step of:

encoding said navigation signal with a data bit on a pulse pair having a first pulse and a second pulse separated by a pulse interval by varying with an encoder as a part of a navigation system said pulse interval between the first pulse and said second pulse to represent the data bit.

2. A method in accordance with claim 1 wherein the step of encoding a data bit comprises the steps of:

generating a pulse pair having a first pulse and a second pulse; and time-shifting the second pulse of the pulse pair to generate an encoded pulse pair having a first time interval between the first pulse and the second pulse in response to a first value of the data bit and a second time interval between the first pulse and a second pulse in response to the second value of the data bit.

3. A method in accordance with claim 2 wherein the step of time-shifting the second pulse further comprises the steps of:

eliminating the second pulse of the pulse pair;

generating a third pulse; and adding the third pulse to the first pulse to generate the first pulse and the second pulse of the encoded pulse pair.

4. A method of encoding data on a pulse pair of a navigation signal having a first pulse and a second pulse, comprising the step of:

generating by an encoder as a part of a navigation system the first pulse and the second pulse of said navigation signal, the first pulse and the second pulse separated by a first time interval in response to a first value of the data and generating the first pulse and the second pulse separated by a second time interval in response to a second value of the data.

5. Apparatus for encoding data on a navigation signal, comprising:

an encoder responsive to an input data bit of either a first or second logic level and repeating at a first BPS rate to generate an output data bit at the same logic level as the input data bit at a second BPS rate, where the second BPS rate exceeds the first BPS rate;

a first pulse generator for generating a clock pulse, said clock pulse comprising a first pulse of a pulse pair;

a second pulse generator responsive to the output data bit of said encoder and the clock pulse to generate a second pulse of the pulse pair, the second pulse having a first time delay between the first pulse for an input data bit at the first logic level and a second time delay between the first pulse for an input data bit at the second logic level; and means for combining the first pulse and the second pulse to produce a pulse pair navigation signal encoded with the input data bit.

6. An apparatus in accordance with claim 5 wherein the second pulse generator includes means for generating an output at the first time delay in the range of about 11.5 microseconds to less than 12.0 microseconds in a first mode of operation and in the range of about 29.5 microseconds to less than 30.0 microseconds in a second mode of operation, and further includes means for generating an output at the second time delay in the range of greater than 12.0 microseconds to about 12.5 microseconds in the first mode of operation and in the range of greater than 30.0 microseconds to about 30.5 microseconds in the second mode of operation.

7. An apparatus in accordance with claim 5 wherein the encoder includes a tri-graph encoder that converts an input data bit having a predetermined logic state into a data bit stream having three data bits, each data bit having the same logic state.

8. Apparatus for encoding data on a navigation signal as set forth in claim 5 including a transmitter responsive to the output of the means for combining to transmit the pulse pair as a navigation signal encoded in accordance with the logic level of the input data bit.

9. Apparatus in accordance with claim 5 wherein said second pulse generator includes:

a first timer responsive to the input data bit and enabled by the clock pulse to generate an output pulse for the first level of the input data bit; and a second timer responsive to the input data bit and enabled by the clock pulse to generate an output for an input data bit at the second logic level.

10. Apparatus for encoding data as set forth in claim 9 wherein said second pulse generator includes a logic gate responsive to the output of the first and second timers and generating an output pulse of a first pulse width for an input data bit at the first logic level and generating a pulse having a second pulse width for an input data bit at the second logic level.

11. Apparatus for encoding data as set forth in claim 10 wherein said second pulse generator further includes a third timer responsive to the output of the logic gate to generate the second pulse of the pulse pair time delayed from the first pulse of the first pulse pair in accordance with the output of the logic gate.

12. Apparatus for encoding data on a navigation signal, comprising:

a first pulse generator for generating a first pulse of a pulse pair; and a second pulse generator responsive to an input data bit of either a first logic level or a second logic level for generating a second pulse of the pulse pair, the second pulse having a first time delay between the first pulse for an input data bit at the first logic level and a second time delay between the first pulse for an input data bit at the second logic level; and means for combining the first pulse and the second pulse to produce a pulse pair navigation signal encoded with the input data bit.

13. Apparatus for encoding data on a navigation signal as set forth in claim 12 including a transmitter responsive to the output of the means for combining to transmit the pulse pair as a navigation signal encoded in accordance with the logic level of the input data bit.

14. Apparatus in accordance with claim 12 wherein said second pulse generator includes:

a first timer responsive to the input data bit and enabled by the first pulse to generate an output pulse for the first level of the input data bit; and a second timer responsive to the input data bit and enabled by the first pulse to generate an output for an input data bit at the second logic level.

15. Apparatus for encoding data as set forth in claim 14 wherein said second pulse generator includes a logic gate responsive to the output of the first and second timers and generating an output pulse of a first pulse width for an input data bit at the first logic level and generating a pulse having a second pulse width for an input data bit at the second logic level.

16. Apparatus for encoding data as set forth in claim 15 wherein said second pulse generator further includes a third timer responsive to the output of the logic gate to generate the second pulse of the pulse pair time delayed from the first pulse of the first pulse pair in accordance with the output of the logic gate.

17. Apparatus for decoding data encoded on a pulse pair of a navigation signal by pulse positioning, comprising:

means responsive to the first pulse of a pulse pair navigation signal to generate a first logic pulse window occurring a predetermined time after input of the first pulse of the pulse pair and generating a second logic pulse window occurring a second time interval after input of the first pulse of the pulse pair, the second time interval exceeding the first time interval;

first logic responsive to the pulse pair of the encoded navigation signal and the first logic pulse window to generate a first logic pulse when the time interval between the first pulse and the second pulse of the pulse pair equals a first time delay, the output of said first logic representing a first logic level of a data encoded on the pulse pair;

second logic responsive to the pulse pair of the encoded navigation signal and the second logic pulse window to generate a second logic pulse when the time interval between the first pulse and the second pulse of the pulse pair equals a second time delay, the output of said second logic representing a second logic level of a data bit encoded on the pulse pair; and third logic responsive to the output of said first logic and said second logic for generating a signal at a first level for an encoded data bit of a pulse pair having a first logic level and for outputting a pulse at a second level for an encoded data bit of the pulse pair having a second logic level.

18. Apparatus for decoding data as set forth in claim 17 further including an encoder responsive to the output of said third logic to correct for errors in the encoded navigation signal.

19. A data link system for transmitting and receiving data encoded on a navigation signal, comprising:

a first pulse generator for generating a first pulse of a pulse pair;

a second pulse generator responsive to an input data bit of either a first logic level or second logic level for generating a second pulse of the pulse pair, the second pulse having a first time delay between the first pulse for an input data bit at the first logic level and a second time delay between the first pulse for an input data bit at the second logic level;

means for combining the first pulse and the second pulse to produce a pulse pair navigation signal encoded with the input data bit;

a transmitter to transmit the encoded pulse pair;

a receiver to receive the transmitted encoded pulse pair; and a decoder to decode the received encoded pulse pair to recover the data encoded thereon.

20. A data link system in accordance with claim 19 wherein the decoder comprises:

means responsive to the first pulse of the pulse pair navigation signal to generate a first logic pulse window occurring a predetermined time after input of the first pulse of the pulse pair and generating a second logic pulse window occurring a second time interval after input of the first pulse of the pulse pair, the second time interval exceeding the first time interval;

first logic responsive to the pulse pair of the encoded navigation signal and the first logic pulse window to generate a first logic pulse when the time interval between the first pulse and the second pulse of the pulse pair equals a first time delay, the output of said first logic representing a first logic level of a data encoded on the pulse pair;

second logic responsive to the pulse pair of the encoded navigation signal and the second logic pulse window to generate a second logic pulse when the time interval between the first pulse and the second pulse of the pulse pair equals a second time delay, the output of said second logic representing a second logic level of a data bit encoded on the pulse pair; and third logic responsive to the output of said first logic and said second logic for generating a signal at a first level for an encoded data bit of a pulse pair having a first logic level and for outputting a pulse at a second level for an encoded data bit of the pulse pair having a second logic level.

\* \* \* \* \*